United States Patent
Kruse et al.

(10) Patent No.: US 6,206,474 B1
(45) Date of Patent: Mar. 27, 2001

(54) PADDING FOR A VEHICLE SEAT

(75) Inventors: Klaudia Kruse, Munich; Willi Geib, Unterschleissheim; Ulrich Schiefer, Munich, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/341,847

(22) PCT Filed: Jan. 15, 1998

(86) PCT No.: PCT/EP98/00213

§ 371 Date: Oct. 8, 1999

§ 102(e) Date: Oct. 8, 1999

(87) PCT Pub. No.: WO98/31561

PCT Pub. Date: Jul. 23, 1998

(30) Foreign Application Priority Data

Jan. 17, 1997 (DE) .............................. 197 01 512
Mar. 6, 1997 (DE) .............................. 197 09 043

(51) Int. Cl.$^7$ ........................................... A47C 7/14
(52) U.S. Cl. ................ 297/452.41; 297/284.3; 297/284.6; 5/644; 5/654
(58) Field of Search .............. 297/452.41, 284.6, 297/216.13, 284.3; 5/655.5, 644, 654, 682, 712

(56) References Cited

U.S. PATENT DOCUMENTS

| 3,982,786 | * | 9/1976 | Burgin et al. | 297/284.3 |
| 4,380,569 | * | 4/1983 | Shaw | 5/655.5 X |
| 4,422,194 | * | 12/1983 | Viesturs et al. | 5/654 X |
| 4,707,872 | * | 11/1987 | Hessel | 5/655.5 X |
| 5,044,030 | * | 9/1991 | Balaton | 5/655.5 X |
| 5,079,786 | * | 1/1992 | Rojas | 5/655.5 X |
| 5,135,282 | * | 8/1992 | Pappers | 297/284.6 X |
| 5,243,722 | * | 9/1993 | Gusakov | 5/654 X |
| 5,369,828 | * | 12/1994 | Graebe | 297/452.41 X |
| 5,556,169 | * | 9/1996 | Parrish et al. | 297/452.41 X |
| 5,590,428 | * | 1/1997 | Roter | 5/654 X |
| 5,657,499 | * | 8/1997 | Vaughn et al. | 297/452.41 X |
| 5,658,050 | * | 8/1997 | Lorbiecki | 297/284.6 X |
| 5,708,999 | * | 1/1998 | Priolo et al. | 5/644 |
| 5,881,409 | * | 3/1999 | Pearce | 5/654 |
| 5,902,010 | * | 5/1999 | Cuevas | 297/216.13 |

FOREIGN PATENT DOCUMENTS

| 3200139 | * | 10/1982 | (DE) | 297/284.6 |
| 3334864 | * | 4/1985 | (DE) | 297/284.6 |

* cited by examiner

Primary Examiner—Peter M. Cuomo
Assistant Examiner—Rodney B. White
(74) Attorney, Agent, or Firm—Evenson, McKeown, Edwards & Lenahan, P.L.L.C.

(57) ABSTRACT

A car seat is provided with upholstery with liquid-filled chambers in which the liquid also has elastic bodies. The chambers are connected to one another through passages, so that a liquid exchange can take place among the individual chambers. The damping and resilience properties of the upholstery can be influenced by liquids of different viscosity and/or passages of different shape and size. The upholstery can be used over the full surface of a car seat or selectively in certain areas thereof.

28 Claims, 3 Drawing Sheets

PADDING FOR A VEHICLE SEAT

BACKGROUND OF THE INVENTION

The present invention relates to a upholstery for a car seat and to a car seat with a upholstery of that kind.

Known car seats are composed of a supporting structure (usually with so-called "base springing"), padding (usually made of a foam material) and a seat cover.

DE 43 36 746 A1 discloses, for example, placing several water cushions in a car seat. The water cushions of the known car seat, however, are not connected to one another. Moreover, control of the resilience and damping properties of the set is not suggested.

U.S. Pat. No. 5,243,722 discloses an air- or liquid-filled upholstery with a special structure having two outer cover layers and two inner intermediate layers. The upholstery is designed for use in the medical field, especially for bed-ridden persons.

SUMMARY OF THE INVENTION

The present invention is addressed to the problem of providing upholstery for car seats by which new possibilities are created for padding car seats, with advantages in seat comfort and adaptability to different customer requirements.

This problem has been solved in accordance with the present invention with the general recognition of the desirability of replacing the conventional padding partially or entirely with upholstery having liquid-filled chambers. The upholstery according to the invention can be used in many ways through the entire range of contact with a car's occupants, for example in the area of the seat upholstery, the back rest or the head support.

According to the present invention, full-breadth upholstery is proposed for the frame of a car seat, covering the entire or most of the surface of the car seat. With the liquid-filled chambers, which are connected to one another through channels, a differential adjustment of the degree of firmness of the individual areas of the contact surface of the seat is achieved. The invention therefore makes possible by selective sizing of the channels between the chambers to produce different rates of the liquid flow between the individual chambers, and thus to control the resiliency and damping properties of the seat. Zones of different firmness can also be created by liquids of differing viscosity, even though the areas with different liquids have no connection with one another. For example, the outlying chambers of the upholstery of the seat or back rest can be filled with a thinner medium than the more greatly stressed central areas of the seat or back rest upholstery. The upholstery according to the invention has a positive influence also on the vibration of the car seat.

In an alternative embodiment of the invention only certain select areas of the car seat are provided with one or more liquid-filled chambers. For example, such chambers can be used in connection with an upper leg brace or a lordosis brace. The upholstery can be integrated into a conventional car seat, for example with foam padding material and textile covering. Depending on the application, however, seats are conceivable with relatively stiff plastic shells or mesh cradles into which liquid-filled chambers are integrated at one or more places. Such upholstery is conceivable, for example, for open recreation vehicles and is characterized by great resistance to weather. The upholstery can be installed and removed with ease.

A plurality of separate cushions can be arranged on a seat such that they support the occupant's body selectively at the latter's points of contact with the seat. The car seat is preferably provided with functionally separate cushioning for the seat surface and for the back rest, while within the two cushions the individual chambers are at least partially connected together. The padding of the seat and back rest are joined together along their marginal areas. Of course, a plurality of independently working cushions can be connected together within the seat upholstery and back rest.

Upholstery is of simple construction and accordingly inexpensive to manufacture. The welded seams create depressions between the chambers which are maintained even under stress and thus assure an exchange of air in the area of contact with the seat. Improved ventilation of those areas of the upholstery that are in contact with the body of the occupant is achieved by one embodiment of the present invention which provides a corresponding permeability of the support layer beneath it. In addition, active ventilation, for example by a blower, can be provided.

Upholstery can be designed for car seats without textile covering, in which the seat contact surface is constituted by the film itself. The transparent, possibly colored plastic material provides a special visual effect, especially when the chambers are filled with dyed liquids. If liquids of different viscosity are provided with different dyes, the "firmness" of the (individual areas of the) upholstery is indicated either within a pad or when upholstery is replaced with a different one.

Special advantages result from an embodiment of the invention where the inserts for a chamber consist preferably of a plurality of small, solid bodies which, together with the liquid, fill the interior of the chamber. The inserts prevent the complete collapse of the chamber under stress, since they are preferably larger than the openings of the passages between the individual chambers, so that the inserts in a chamber remain permanently in order. In addition, it is likewise possible to coordinate the size of the inserts and passages such that the inserts are exchanged between the individual chambers. The flow of the liquid can also be controlled by the inserts.

The individual bodies can vary in size and firmness according to the position of the chamber with respect to the car's occupants and thus according to the specific stress at the particular point on the seat. The bodies prevent, for example, the complete flattening of a chamber. They can be so designed as to their size and resilience, for example, that they produce a massaging effect. The inserts can also be used selectively as a design element if the film is made transparent. By varying the color and/or shape of the inserts (e.g., spherical or lenticular, but basically also angular shapes) visual effects can be achieved, while the shape of the inserts also affects the seat properties. The specific gravity of the inserts is to be coordinated with the liquid in the chamber, so that the inserts either float, sink or are suspended in the liquid. Especially inserts of limited compressibility and resilience can improve seating comfort. The inserts themselves can be in the form of liquid-filled hollow bodies, for example.

By providing a pressurizing system, the pressure of the liquid in the chamber can be actively varied. In comparison with an only passive adjustment of the pressure distribution by the car occupant's body weight, the resilience and damping properties of the seat can be actively influenced in order to achieve improved seating comfort and also to improve safety for the car's occupants. Preferably the upholstery has a plurality of liquid-filled chambers which can be connected to one another as described above. Due to the contemplation of an external supply of pressure, the springs of the car seat can be eliminated, resulting in a considerable saving of cost.

By another embodiment of the invention an oppositely phased pressure build-up can be produced in the liquid-filled chamber in order to counteract the vibration transmitted to the seat. Thus a balancing of the resonance system of the occupants' car seat is possible, so that a decided improvement of their tolerance of vibration is achieved. Due to the closed control circuit vibrational stress on the car's occupants is minimized. Moreover, the movements of the chambers also set the air around the upholstery in motion, thus achieving an effective ventilation and dehumidification.

The occupant of the vehicle can establish the desired firmness and vibrational properties of the upholstery, which means one can vary the characteristics of the seat and control one's seating comfort. Thus, according to the choice that is made, a "sport seat" or a "comfort seat" can be set up. In the case of a plurality of chambers, their firmness can be adjusted individually, for example. The active control of seat comfort can, of course, be used in addition to this basic setting of the seat characteristic selected by the car's occupants.

In case of a collision, the forces of inertia acting on the occupants will cause the upholstery to be compressed, especially at the front edge of the seat, so that the danger exists that the vehicle's occupant will slide under the applied safety belt. This "submarining effect" can be counteracted instantly by hardening the upholstery with the external pressure source.

According to the present invention, a massaging effect is achieved which counteracts the fatigue of the car's occupants and stimulates the flow of blood in the muscles. The massage can be brought about by periodical or irregular fluctuations of pressure. Also, programs involving a preselected or individually programmed pressure variations can be recorded in the control or regulating system.

By one configuration of the invention, a physiological relief of the driver can be achieved by a uniform bias of the seat surface. A select configuration of the upholstery provides in this case for an appropriate load distribution. A full control circuit is not essential, because the establishment of certain design parameters suffices as a rule to achieve a uniform bias of the seat surface. If the driver's seat must satisfy orthopedic prescriptions, selective local relief can be provided for particular parts of the body.

The result of the integration of the sensor or sensors in the upholstery for the vehicle seat is a smaller number of components and hence less labor involved in making the seat. Due to the unvarying arrangement of the sensor in the film, the conditions for measurement do not change through the life of the upholstery, so that low relative errors are achieved. The present invention makes pressure control over a large area possible.

The sensor can be, for example, in the form of a flexible "piezoceramic film." Such films consist, for example, of polyvinylidene fluoride, an easily manufactured synthetic polymer, in which a piezoelectric effect can be induced by an electrical process. This effect produces an electrical signal available as a measure of the mechanical deformation of the film.

Car seats with replaceable upholstery according to the invention, can be manufactured in a great number of variants. Because the upholstery is easily changed, however, the customer is also able to change the upholstery to achieve the desired seat comfort. Alternatively, the upholstery can be configured as an integral component of a seat without providing for regular changing.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
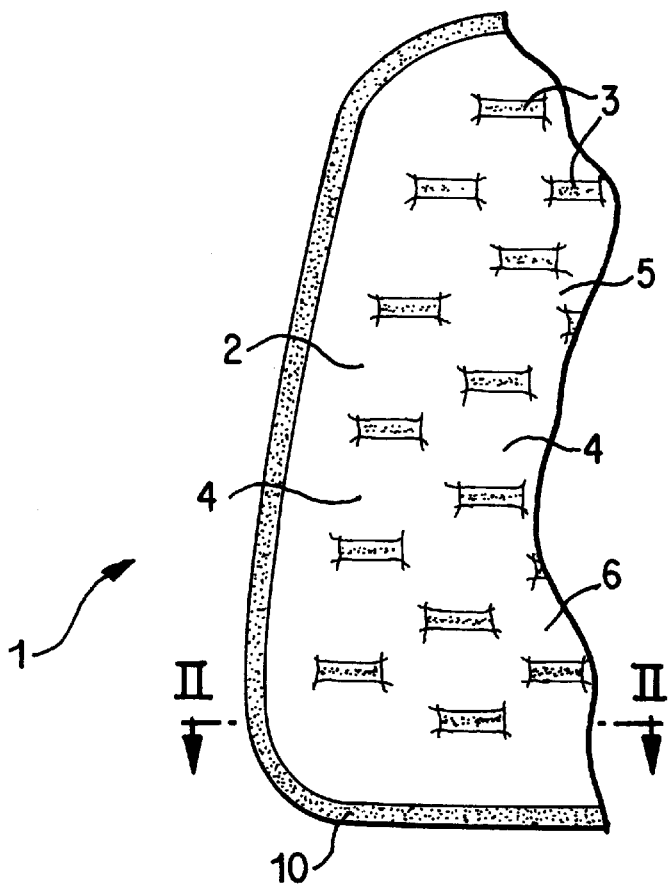
FIG. 1 is a schematic partial plan view of upholstery according to the present invention.
Figure 2:
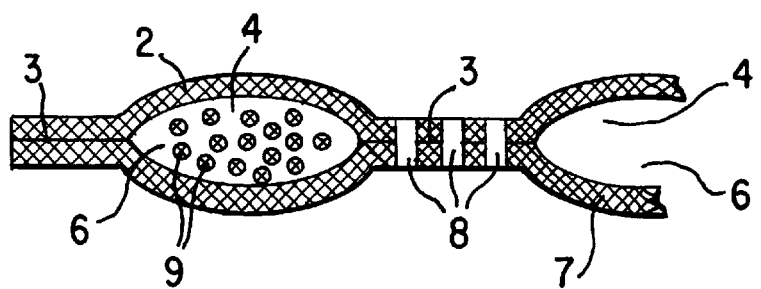
FIG. 2 is an enlarged sectional view taken along line II—II in FIG. 1.

FIGS. 1 and 2 show the basic construction of full-surface upholstery 1 according to the invention. The upholstery 1 is formed by a top and bottom film 2 and 7, respectively. The films 2, 7 are joined together by a number of weld seams 3. The weld seams 3 divide the upholstery 1 into individual chambers 4 which are filled with a liquid 6. The weld seams 3 between the chambers 4 are provided at least partially with perforations 8 to improve the exchange of air between the top and bottom sides of the upholstery 1. A plurality of spherical inserts 9 can also be contained in addition to the liquid 6 in the chambers 4, as represented in the left portion of FIG. 2. The spheres 9 can be of different colors to correspond, for example, to different degrees of firmness. The liquid 6 can consist, for example, of water, an oil-and-water mixture, a gel, etc. Heating of the liquid 6 in chambers 4 can be achieved at little expense with a heating system. To prevent damage, the films 2, 7 are selected to withstand great stress accordingly. A liquid 6 can also be used which, in case the chambers become punctured, will harden by contact with the air and automatically seal the puncture. The films 2, 7 can be made in colors. Particularly in the embodiment using spheres 9 within the chambers, transparent films 2 are used.

The upholstery 1 covers, for example, the entire surface of a cushion for a car seat and is defined at its lateral edges by a frame 10 in the form of a sealing weld seam. The upholstery 1 can be attached, for example, by hook-and-loop tape or by clips to the supporting structure of a car seat.

Figure 3:
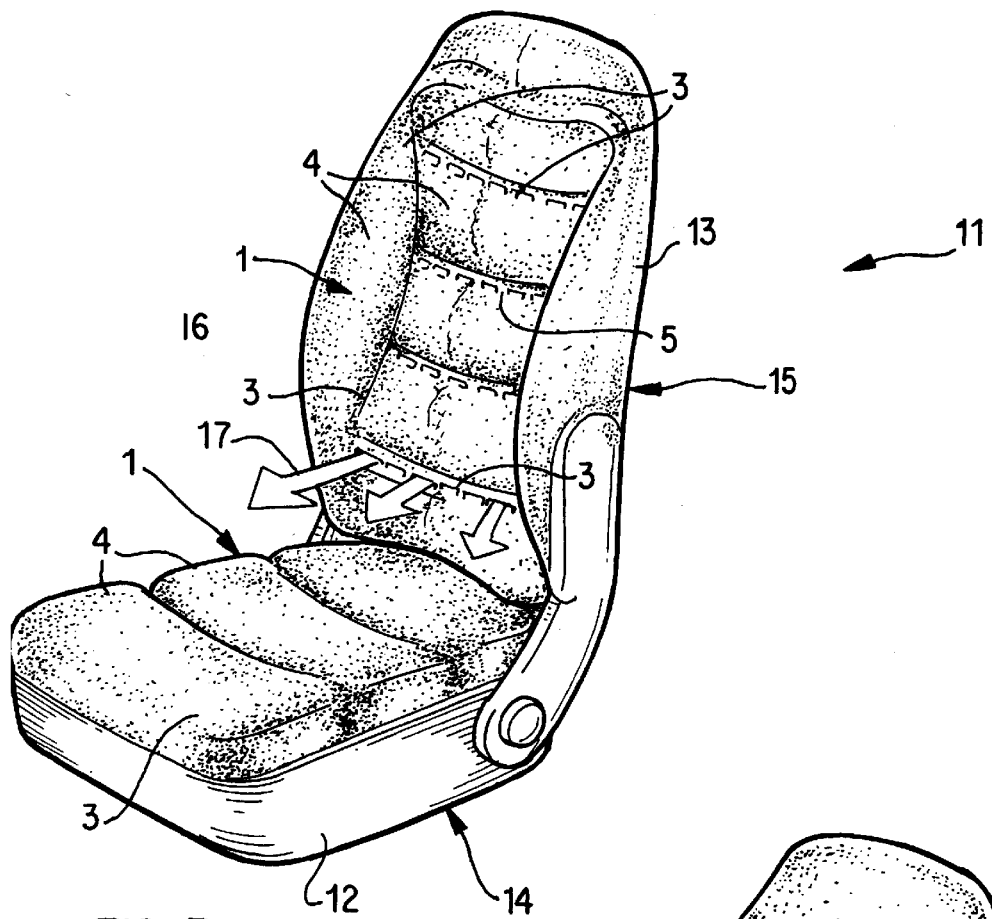
FIGS. 3 to 5 are perspective views of different embodiments of vehicle seats upholstered according to the invention.

FIG. 3 shows a car seat 11 with plastic shells 12, 13 as the structure supporting the seat upholstery 14 and back rest 15. Both shells 12, 13 are covered on their entire surface with a one-piece upholstery 1 which is formed by several liquid-filled chambers 4. Also, a head support can be provided with another upholstery. The individual chambers 4 of both upholsteries 1 are defined by weld seams 3 running chiefly in the direction of the width of the vehicle except for the vertically oriented weld seams 3 for bonding the side upholsteries 16 to the seat back 15. The weld seams 3 are partially interrupted, thus forming passages 5 between the individual chambers 4 of the particular upholstery 1. In addition, at least some weld seams 3 are perforated in order to permit an exchange of air between the front and back of the car seat 11 as shown by the air flow arrows 17.

Figure 4:
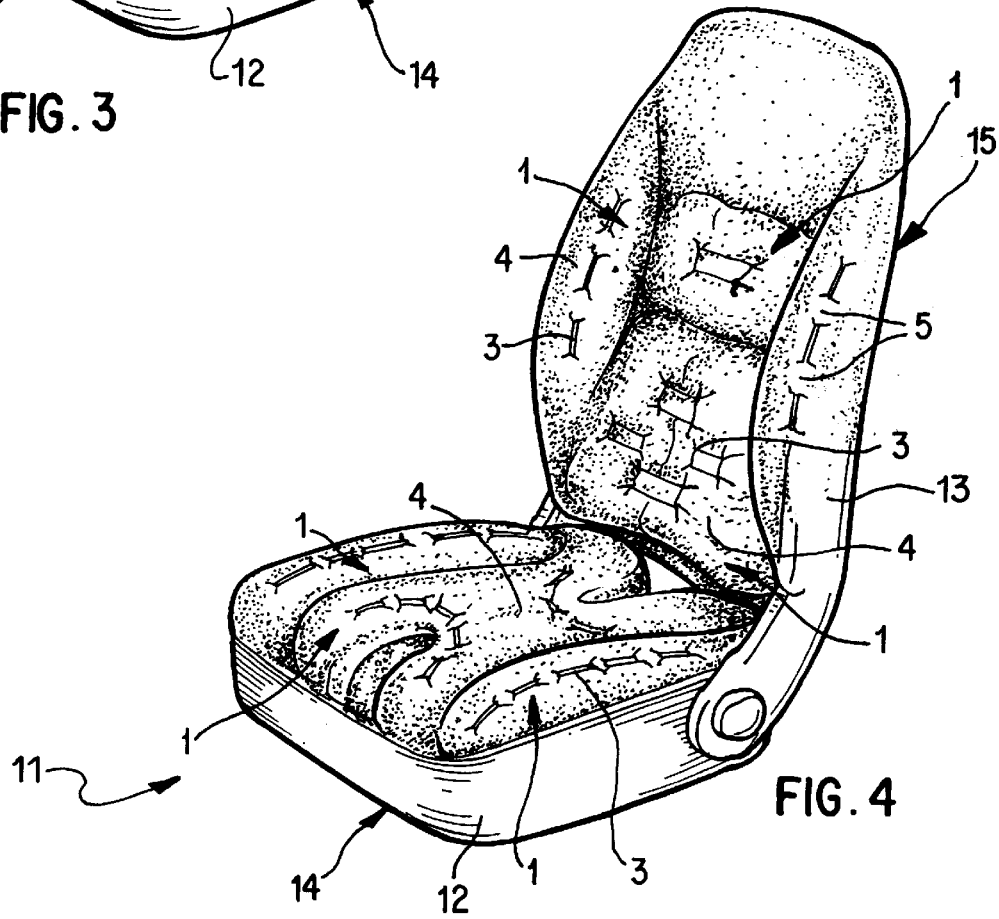

FIG. 4 shows a car seat 11 on whose plastic shells 12, 13 a plurality of separate smaller-area cushions 1 are disposed. The cushions 1 are situated only in those areas of the car seat 11 which come in contact with the body of a car occupant, so that support of the corresponding parts of the body of the occupant is provided only at these predetermined parts in contact. In particular, two identical lateral cushions 1 as well as two middle cushions 1 of different size are provided on the seat back 15, while a total of three elongated, individually shaped cushions 1 are disposed on the seat 14.

Figure 5:
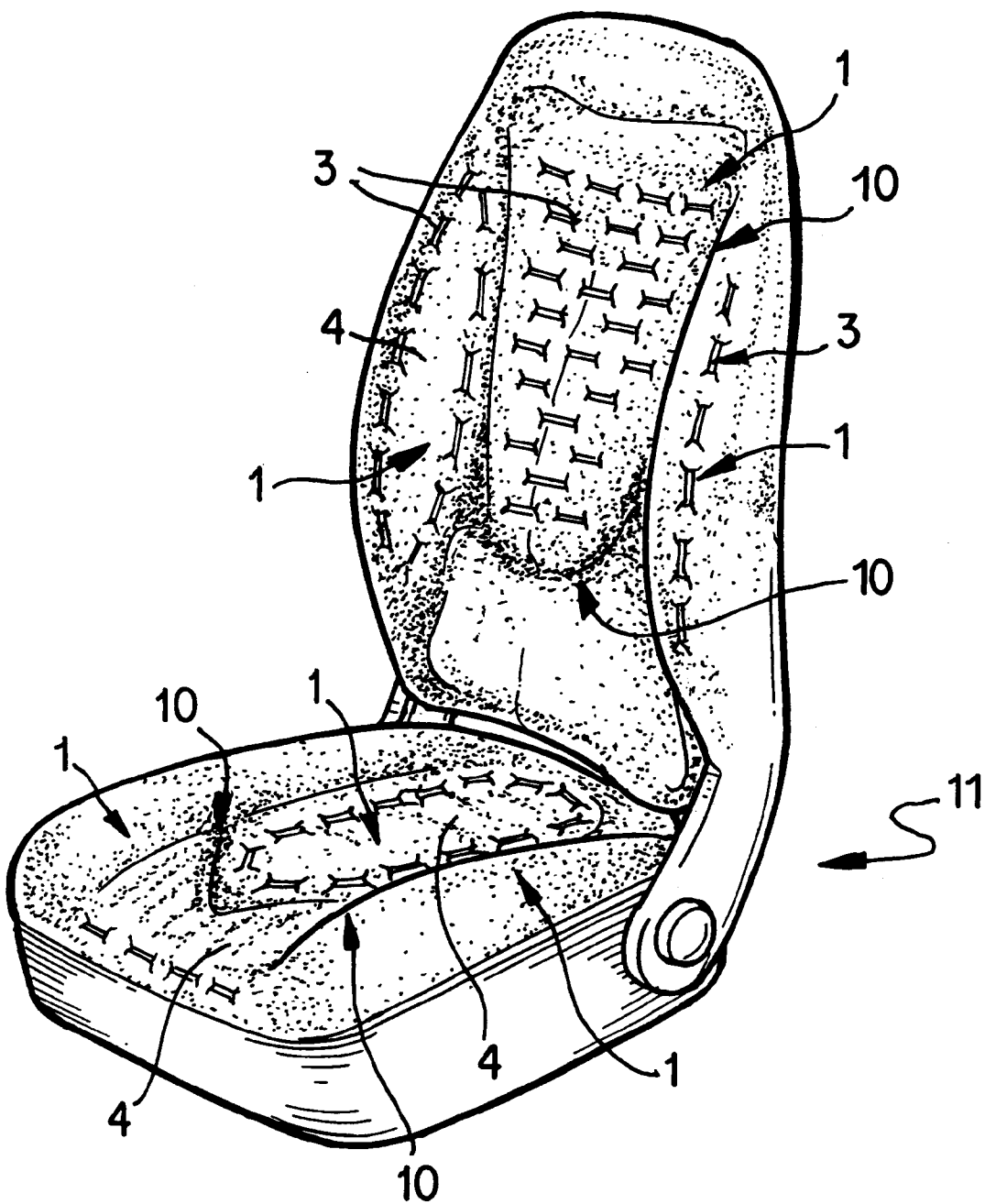

The car seat 11 of FIG. 5 is provided with a plurality of cushions 1 between which no liquid exchange takes place but which, unlike the embodiment in FIG. 4, are joined together along their borders 10. These boundary weld seams 10 can, like the weld seams 3, be perforated to improve ventilation of the contact surface of the seat. The individual cushions 1 of the car seat 11 of FIGS. 3 to 5 are preferably constructed in the same manner as in FIGS. 1 and 2. Of course, the supporting structure of the car seat 11 can also be formed by shells of a metallic material, covered tubular frames, and the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Upholstery for a vehicle seat, comprising a plurality of liquid-filled chambers operatively connected at least partially by passages, wherein at least one of viscosity of liquid in the chambers and the shape and size of the passages being so that, as viewed through a surface of contact with vehicle occupants, provide different damping and resilience properties appropriate to stresses placed thereon by the vehicle occupants with the liquid.

2. Upholstery (1) for a car seat (11), comprising at least one liquid-filled chamber (4) operatively disposed at a specific, limited area of a contact surface of the car seat (11) with an occupant of the vehicle to selectively support involved body parts of the occupant.

3. The upholstery according to claim 2, wherein a plurality of separate cushions are disposed on the car seat.

4. The upholstery according to claim 2, wherein a plurality of independently operating cushions are combined together along marginal seams thereof to form an integral structure wherein the liquid-filled chambers of the cushions are out of communication with one another.

5. The upholstery according to claim 1, wherein a plurality of separate cushions are disposed on the vehicle seat (11).

6. The upholstery according to claim 1, wherein a plurality of independently operating cushions are combined together along marginal seams (10) thereof to form an integral structure wherein the liquid-filled chambers (4) of the cushions (1) are out of communication with one another.

7. The upholstery according to claim 1, wherein the upholstery (1) has a top and a bottom of synthetic material films (2, 7) welded to one another in a liquid-tight manner to form the chambers (1).

8. The upholstery according to claim 7, wherein weld seams (3) are at least partially perforated between the chambers (1).

9. The upholstery according to claim 7, wherein at least the upper-top film material (2) is at least one of transparent and colored.

10. The upholstery according to claim 1, wherein the chambers (4) are filled with a colored liquid (6).

11. The upholstery according to claim 1, wherein the chambers (4) contain at least one solid body insert.

12. The upholstery according to claim 11, wherein the insert is a plurality of bodies (9) of at least one of different size and hardness.

13. Upholstery for a car seat, comprising at least one liquid-filled chamber, a pressure-producing system for varying the pressure in the chamber, and a control system cooperating with the pressure-producing system such that, upon introduction of vibrations into the upholstery, a pressure curve can be produced in the at least one chamber opposite in phase to the vibrations.

14. Upholstery for a car seat, comprising at least one liquid-filled chamber, a control system, and a pressure-producing system for varying the pressure in the chamber, the pressure-producing system cooperating with the control system such that the pressure in the at least one chamber is adjustable according to a pattern set by occupants of the car.

15. The upholstery according to claim 14, wherein the upholstery consists of at least partially of a material in which at least one sensor is integrated for detecting pressure exerted by at least one of occupants and the pressure in the chamber.

16. Upholstery for a car seat, comprising at least one liquid-filled chamber, a control system, and a pressure-producing system for varying the pressure in the chamber, the pressure-producing system cooperating with the control system such that, upon detection of a collision pressure in the at least one chamber is abruptly increasable.

17. The upholstery according to claim 16, wherein the upholstery consists of at least partially of a sheet-like material in which at least one sensor is integrated for detecting pressure exerted by at least one of occupants and the pressure in the chamber.

18. Upholstery for a car seat, comprising at least one liquid-filled chamber, a sensor-based control system, and a pressure-producing system for varying the pressure in the chamber based upon sensor input, the pressure-producing system cooperating with the control system such that pressure variations are automatically producible in the at least one chamber to provide a massaging effect.

19. The upholstery according to claim 18, wherein the upholstery consists of at least partially of a material in which at least one sensor is integrated for detecting pressure exerted by at least one of occupants and the pressure in the chamber.

20. Upholstery for a car seat, comprising a plurality of liquid-filled chambers operatively connected at least partially by passages, with viscosity of at least one of a liquid in the chambers and shape and size of the passages being such that, over a surface of contact with at least one occupant a constant surface pressure is produced.

21. The upholstery according to claim 20, wherein the upholstery consists of at least partially of a material in which at least one sensor is integrated for detecting pressure exerted by at least one of occupants and the pressure in the chamber.

22. The upholstery according to claim 13, wherein the upholstery consists at least partially of a material in which at least one sensor is integrated for detecting pressure exerted by at least one occupant and the pressure in the chamber.

23. A car seat (11) with at least one cushion (1), comprising a plurality of liquid-filled chambers (4) operatively connected at least partially by passages (5), wherein at least one of viscosity of liquid (6) in the chambers (4) and the shape and size of the passages (5) being so sized that, as viewed through a surface of contact with vehicle occupants, areas of different damping and resilience properties are formed which are appropriate to stresses placed thereon by the vehicle occupants.

24. A vehicle seat base, comprising an adjusting device, at least one fluid-filled chamber, and a pressure-generating device for changing pressure in the fluid-filled chamber, wherein the pressure-generating device operatively cooperates with the adjusting device such that, when vibrations are introduced into the base, a pressure flow of opposite phase to the vibrations are generatable in the fluid-filled chamber.

25. A vehicle seat base, comprising an adjusting device, at least one fluid-filled chamber and a pressure-generating device for changing pressure in the fluid-filled chamber, wherein the pressure-generating device operatively cooperates with one of a control and the adjusting device so that the pressure in the fluid-filled chamber is abruptly increasable when a vehicle collision is detected.

26. A vehicle seat base, comprising a plurality of fluid-filled chambers at least partially connected with one another by channels, wherein at least one of viscosity of fluid is the fluid filled-chamber shape and size of the channels are individually dimensioned such that a constant pressure per unit area is produced over an area in contact with a vehicle occupant.

27. The vehicle seat base according to claim 25, wherein the pressure-generating device cooperates with the control device such that the pressure in the fluid-filled chamber is adjustable as specified by a vehicle occupant.

28. The vehicle seat base according to claim 25, wherein the pressure-generating device cooperates such that pressure fluctuations are producable to provide a massaging effect in the fluid-filled chamber.

* * * * *